United States Patent [19]

Heitman

[11] Patent Number: 5,452,263
[45] Date of Patent: * Sep. 19, 1995

[54] METHOD AND APPARATUS FOR DETECTING LOCATION OF A SUBTERRANEAN PIPE

[76] Inventor: Lynn B. Heitman, 4711 Sycamore La., Parker, Tex. 75002

[ * ] Notice: The portion of the term of this patent subsequent to Jul. 30, 2008 has been disclaimed.

[21] Appl. No.: 166,557

[22] Filed: Dec. 14, 1993

Related U.S. Application Data

[63] Continuation of Ser. No. 936,105, Aug. 26, 1992, Pat. No. 5,269,335, which is a continuation-in-part of Ser. No. 736,459, Jul. 26, 1991, abandoned, which is a continuation of Ser. No. 558,824, Jul. 27, 1990, Pat. No. 5,036,497.

[51] Int. Cl.$^6$ ............................. G01S 3/80; G01H 17/00
[52] U.S. Cl. ......................... 367/120; 73/40.5 A; 73/584
[58] Field of Search ................... 367/13, 120, 36, 124; 73/40.5 A, 584, 592, 594

[56] References Cited

U.S. PATENT DOCUMENTS

| | | | |
|---|---|---|---|
| 3,979,724 | 9/1976 | Silverman et al. | 367/36 |
| 4,083,229 | 4/1978 | Anwey | 73/597 |
| 4,911,012 | 3/1990 | Ziska | 73/584 |
| 5,036,497 | 7/1991 | Heitman | 367/120 |

*Primary Examiner*—Ian J. Lobo
*Attorney, Agent, or Firm*—Gregory M. Howison

[57] ABSTRACT

A method and apparatus for detecting the location of subterranean pipe includes sensors 24 and 26 which detect seismic energy. A pulsing valve (20) is disposed on one end of a water line (10) to allow water to intermittently flow and be shut off. This results in a water hammer effect which send shock waves (22) outward from the pipe (10). This is detected by the sensors (24) and (26) and then transmitted to a detector (32) to provide a differential indication. The locations of the sensors (24) and (26) will determine the differential balances therebetween such that when the sensors (24) and (26) are directly over the pipe (10), an indication of the location of the pipe is provided. Further, a reference sensor (19) is provided to allow distance measurement along the pipe by measuring the difference between the received energy at sensor (19) and either of sensors (24) or (26).

10 Claims, 7 Drawing Sheets

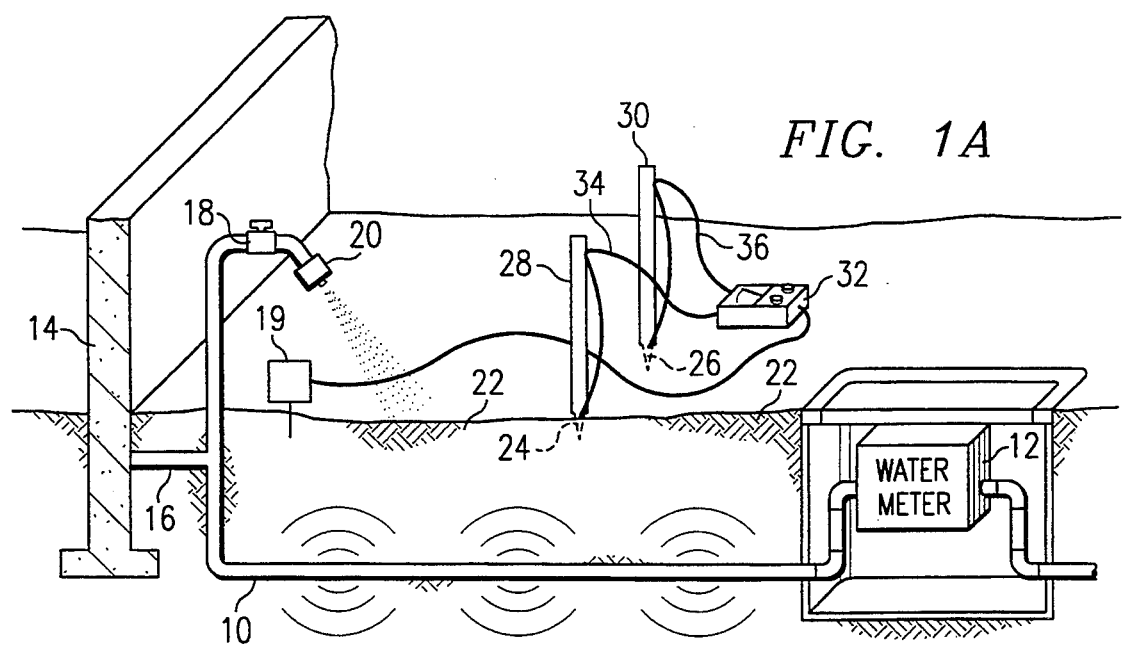
FIG. 1A
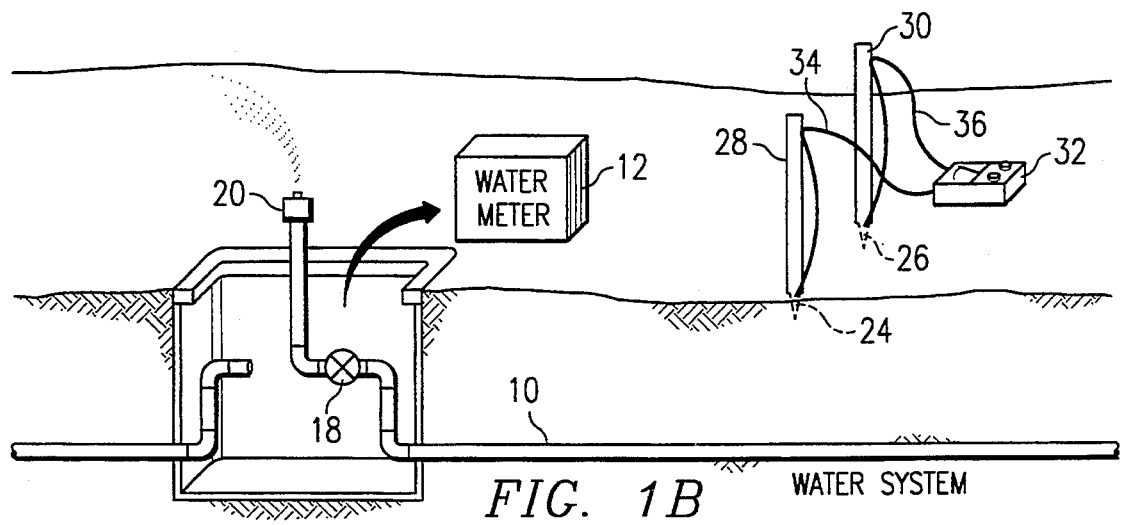
FIG. 1B    WATER SYSTEM
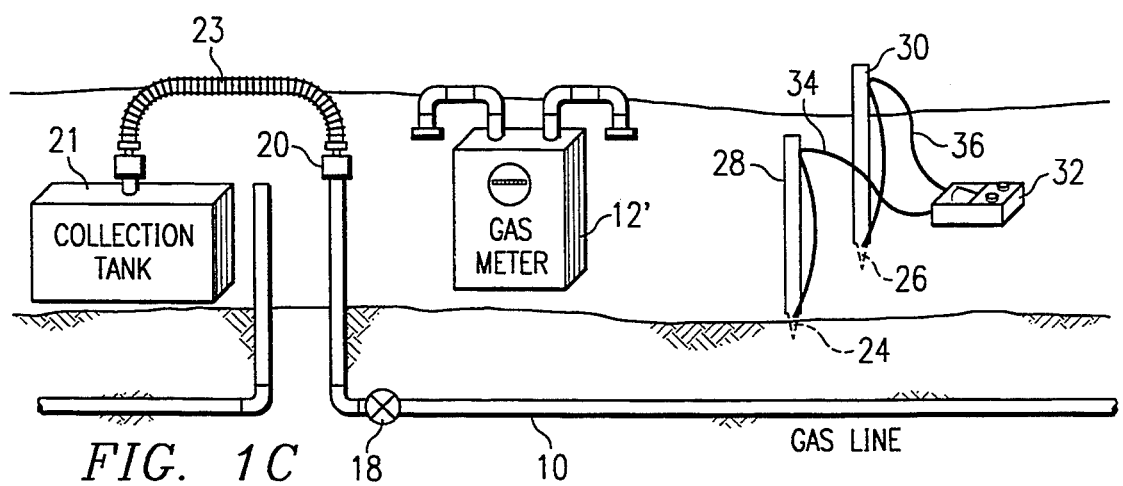
FIG. 1C    GAS LINE 5,452,263

METHOD AND APPARATUS FOR DETECTING LOCATION OF A SUBTERRANEAN PIPE

CROSS REFERENCE TO RELATED APPLICATION

This application is a continuation of application Ser. No. 07/936,105, filed Aug. 26, 1992 now U.S. Pat. No. 5,269,335, issued Dec. 14, 1993, which is a continuation-in-part of U.S. patent application Ser. No. 736,459, filed Jul. 26, 1991, entitled "Automatic Pulsing Valve", now abandoned which is a continuation Ser. No. 558,824 filed Jul. 27, 1990, now U.S. Pat. No. 5,036,497, issued Jul. 30, 1991, entitled "Method and Apparatus for Detecting Location of a Subterranean Pipe".

TECHNICAL FIELD OF THE INVENTION

The present invention pertains in general to detection systems for detecting the location of subterranean pipes, and more particularly, to an apparatus for detecting the location of subterranean pipes utilizing seismic methods.

BACKGROUND OF THE INVENTION

Locating subterranean pipes is a necessity in view of costs incurred due to accidental damage thereto. For example, utility companies often damage subterranean pipes as a result of trenching procedures, etc. Although most subterranean pipes are marked on maps and the such, this is typically unreliable in that the pipes oftentimes are routed in different locations as compared to those on a given map.

Another problem that exacerbates the task of locating a given pipe is the widespread use of non-metallic pipe such as plastic or PVC pipe. Previous methods for locating metallic pipes utilized metal detectors. This is inadequate when considering the use of PVC pipe. Another method for locating pipes is to bury a metal wire such as copper adjacent to the pipe to facilitate later location thereof with metal detectors or cable locators. This, of course, is very expensive and impractical for systems utilizing a large amount of subterranean pipe, such as a sprinkler system. Other applications include pipes located in rivers, lakes and the oceans which are difficult to access with conventional metal detectors.

In view of the above disadvantages, there exists a need for a method and apparatus for economically locating subterranean pipe.

SUMMARY OF THE INVENTION

The invention disclosed and claimed herein comprises a fluid valve for being interfaced with the interior of a fluid-carrying member. The valve includes an inlet for interfacing with the interior of the fluid-carrying member and a pressure device for imparting a pressure wave to the pipe through the fluid carried therein, the pressure wave being imparted for a predetermined duration of time. An actuation device controls the pressure device such that the pressure wave is created on a periodic basis.

In another aspect of the present invention, the valve also includes an outlet for interfacing with a region having a lower pressure than the interior of the fluid-carrying member. The pressure wave device is comprised of a flow control device that is disposed between the inlet and the outlet for controlling the flow between a substantially free flow mode of operation and a substantially restricted flow mode of operation. When the flow control device is changed from the substantially free flow mode of operation, a pressure wave is transmitted through the fluid in the fluid-carrying member. The actuation mechanism is operable to alternate the flow control device between the substantially free flow mode of operation and the substantially restricted flow mode of operation on a periodic basis.

In a further aspect of the present invention, the actuation mechanism operates as a function of the pressure difference between the inlet and the outlet. The actuation mechanism changes the valve from the substantially free flow mode of operation to the substantially restricted flow mode of operation as a function of the flow control device operating in the substantially free flow mode of operation for a predetermined duration of time. Similarly, the actuation control mechanism changes the flow control device from the substantially restricted mode of operation to the substantially free flow mode of operation in response to the flow control device being in the substantially restricted flow mode of operation for a predetermined duration of time.

In a yet further aspect of the present invention, the flow control device is comprised of a valve seat that is disposed between the input and the output and a valve for interfacing with the valve seat and controlled by the actuating mechanism. The valve is disposed within the flow of fluid on the inlet side thereof such that the flow forces the valve against the seat. A spring member is provided for acting against the direction of movement of the valve closing against the valve seat and has a predetermined spring tension associated therewith. Therefore, when the valve is urged against the valve seat by the flow of the fluid, the spring tension is operable to force the closed valve open.

In an even further aspect of the present invention, the spring tension can be varied. A stop is also provided to determine the maximum amount of distance that the valve can be urged away from the valve seat. This distance can be varied.

BRIEF DESCRIPTION OF THE DRAWINGS

For a more complete understanding of the present invention and the advantages thereof, reference is now made to the following description taken in conjunction with the accompanying Drawings in which:

FIGS. 1A–1D illustrate a perspective view of the method and apparatus of the present invention for detecting the location of a subterranean pipe;

DETAILED DESCRIPTION OF THE INVENTION

Figure 1D:
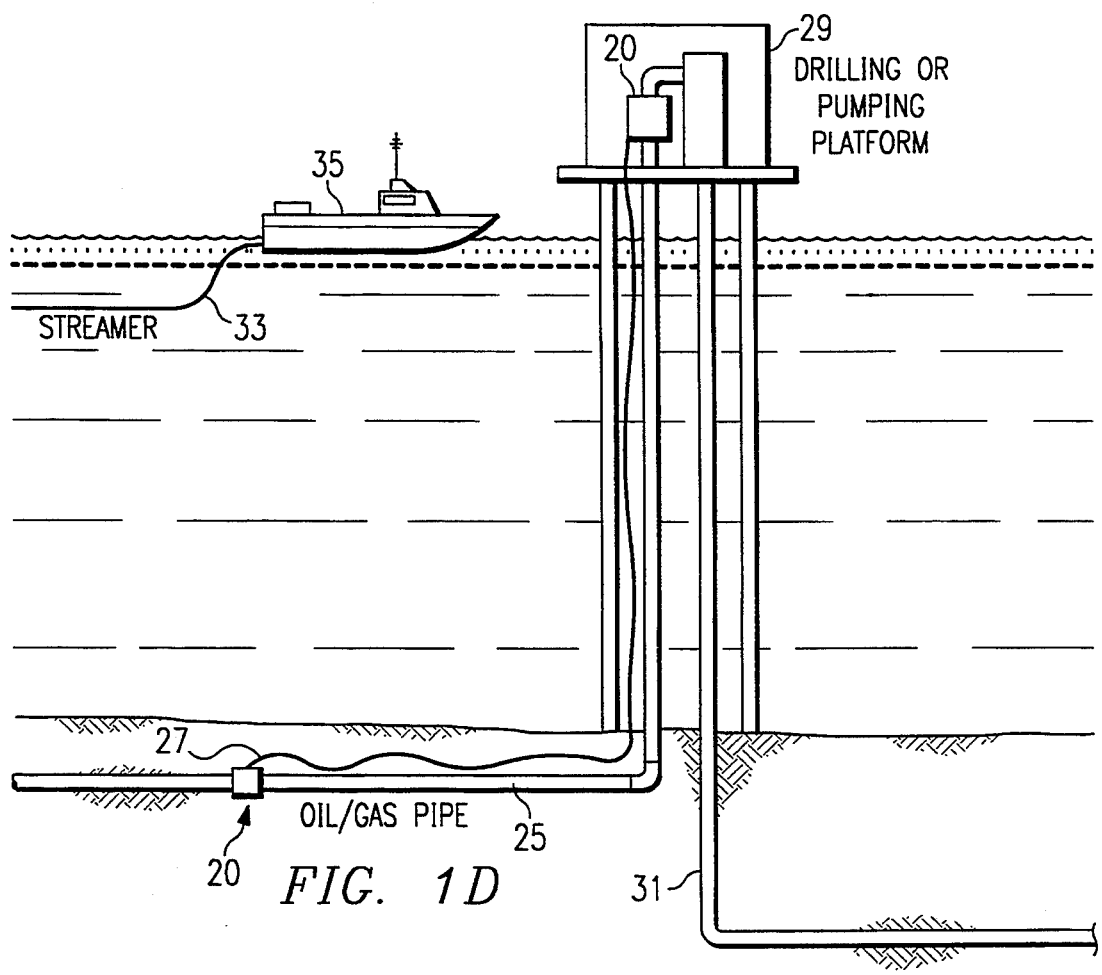

Referring now to FIG. 1A, there is illustrated a perspective view of the method and apparatus for locating a subterranean pipe in accordance with the present invention. In the example illustrated in FIG. 1A, a water line 10 is illustrated that is typically buried between twelve to twenty-four inches below the ground. The water line 10 extends from a water meter 12 that interfaces with the public water supply and extends typically from the street boundary of the property to the edge of a building 14. The pipe typically enters the building 14 through an inlet 16. In addition, there is typically some exterior water faucet or water outlet 18 that interfaces with the water system. For illustrative purposes, the water outlet 18 is illustrated as proximate to the inlet 16. In fact, most residences locate the outside faucet proximate to the inlet 16 to the house. However, as will be described hereinbelow, it is only necessary to provide some outlet to the water system near the end of the pipe 10.

A pulsing valve 20 is disposed on the water outlet 18. Also valve 20, as will be described in more detail hereinbelow, is operable to create a "water hammer" effect which in operation will send high pressure pulses down the water line 10. The way in which the water hammer operates is by abruptly terminating the flow of water. Therefore, the pulsing valve 20 allows the water or fluid in the pipe 10 to flow at full force and then abruptly interrupts the flow of this water. This abrupt action will create an immediate surge in the pipe. This surge extends from the pulsing valve 20 throughout the length of the pipe 10, this pulse extending from valve 20 back to the water meter 12 and beyond to the public water supply. In addition, the water hammer effect also enters the remaining portion of the pipe on the opposite side of building 14 from the inlet 16.

In order to perform a distance measurement, a reference sensor 19 is utilized wherein the time at which the shock wave is received by the reference sensor and the time at which it is received by the sensors 24 and 26 can be determined. In this manner, a distance measurement can be made. This application will be described hereinbelow in more detail.

The water hammer effect imparted to the pipe 10 by the pulsing valve 20 is represented by shock waves 22 in the ground. Two sensors 24 and 26 are inserted into the ground somewhere above the pipe 10. The sensors 24 and 26 are disposed on the end of two poles 28 and 30, respectively. The sensor 24 is connected to a detection device 32 through a wire 34. In a similar manner, the detection sensor 26 is connected to the detection box 32 through a wire 36. The sensors 19, 24 and 26 comprise seismometers of the type SM-4 manufactured by Halliburton Co. Hydrophones of similar sensitivity can be used in water or fluid environments.

In operation, the poles 28 and 30 allow an operator to insert the sensors 24 and 26, respectively, into locations in the ground above the pipe 10 and disposed a predetermined distance apart. When a pulse is transmitted down the water line 10 by the water hammer effect imparted thereto by the valve 20, the detection device 32 detects the relative strengths of the shock wave. This will provide some indication as to the relative position of the sensors 24 and 26 relative to the water line 10.

Referring now to FIGS. 1B–1C, there are illustrated three alternate embodiments of the present invention. In FIG. 1B, the line 10 is broken at the water meter wherein the water meter 12 is there removed. The valve 18 is located on the inlet to the water meter 12 from the municipal or private water system. The municipal or private water system can therefore be tested. In FIG. 1C, a municipal gas line represents the fluid line 10 and a gas meter 12' is removed and the valve 18 disposed on the inlet side to the gas meter 12' and a valve 20 disposed on the opposite side. The valve 20 in FIG. 1C is connected to a collection tank 21 through hose 23.

In FIG. 1D, an oil/gas pipe 25 has a plurality of pulsing valves 20 disposed at periodic distances along the length thereof with control wiring 27 connecting the valves 20. An offshore platform 29 is provided to which the pipeline 25 is connected. Oil and gas are being produced from a horizontally drilled well 31. The location of the pipeline 25 and the well 31 are determined by a seismic site survey vessel 35 which is towing a seismic streamer 33. The shock waves from the pipeline 25 and the well 31 are imparted the medium surrounding them and received through hydrophones disposed on a streamer 33.

Figure 2:
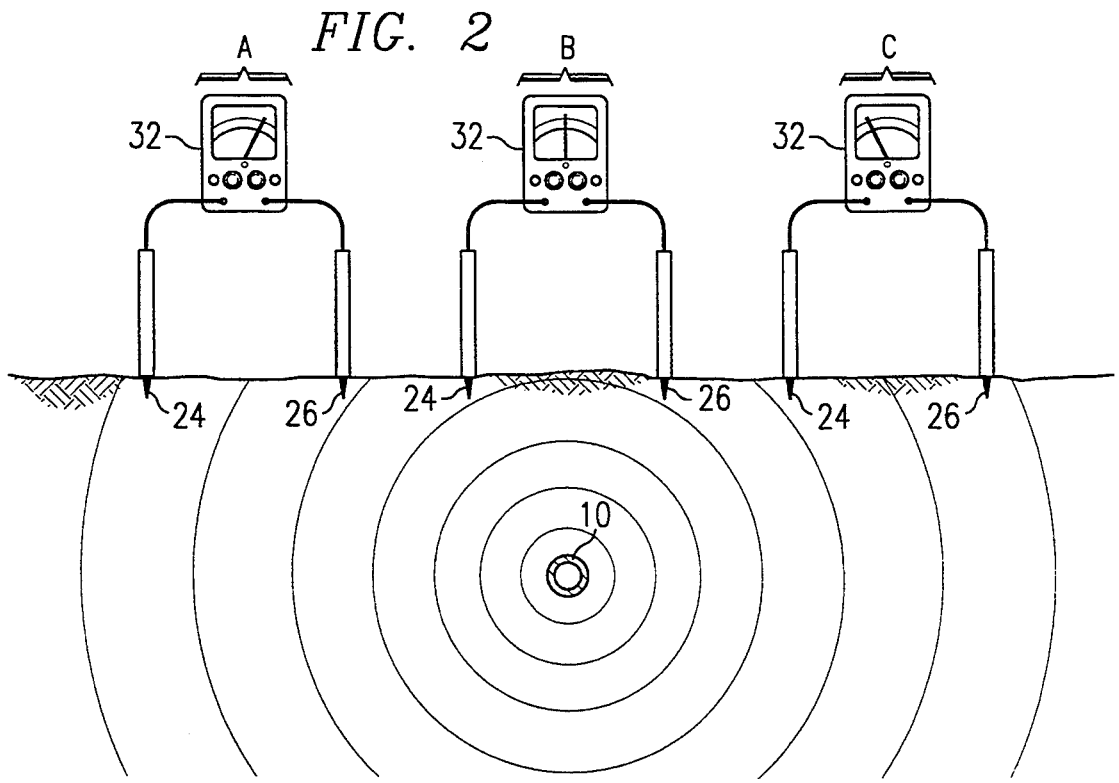
FIG. 2 illustrates a cross-sectional view of a subterranean pipe and the sonic waves output to the surrounding terra with placement of the sensor in various locations.

Referring now to FIG. 2, there is illustrated a more detailed description relative to a cross-section of the water line 10, illustrating the placement of the sensors 24 and 26. There is illustrated three separate locations of the sensors 24 and 26, "A", "B" and "C". Illustrated in position "A", the sensors 24 and 26 are placed side by side and spaced a predetermined distance apart and in a plane substantially perpendicular to the cross-section to the longitudinal axis of the water line 10. They are however offset or placed to one side of the longitudinal axis of the water line 10. Therefore, the strength of the signal reaching the sensor 24, which is disposed farther away from the water line 10 than sensor 26, is weaker than the signal reaching the sensor 26. Therefore, an indication will be provided on the detector 32 that the signal at sensor 26 is stronger than the signal on sensor 24. This will also indicate that both sensors 24 and 26 should be moved in the direction indicated by the detection device 32 or towards sensor 26

In the second position, position "B", the sensors 24 and 26 are disposed the same predetermined distance apart but they essentially straddle the water line 10. In this position, the signal reaching sensor 24 is identical in strength to the signal reaching sensor 26. The detector 32 will indicate this as an equal strength signal. This will, of course, indicate that the water line 10 is directly beneath the center point between the two sensors 24 and 26.

In the third position, position "C", the sensors 24 and 26 are disposed on the opposite side of the water line 10 and offset therefrom, as compared to the position "A". In this position, sensor 24 is closer to the water line 10 than sensor 26. As such, sensor 24 will now receive a stronger signal than sensor 26. The detector 32 will indicate this to the operator, the operator thus having knowledge of the fact that the water line 10 is located in the direction of the sensor 24.

Typically, an operator will begin traversing a pipe from the pulsing valve 20 outward. Since it is unknown which direction the water line 10 traverses or how many connections it will have, this provides an adequate starting point. As will be described hereinbelow, the water hammer effect imparted by the pulsing valve 20 can be automatic, or it can be manual with an operator sitting at the valve 20 to actuate the valve. In the manual method, another operator manually moves the sensors 24 and 26 with the poles 28 and 30, respectively, and instructs the operator at the pulsing valve 20 to actuate the value. As the operator controlling the sensors 24 and 26 moves outward along the water line, the location thereof can be determined.

If the sensors 24 and 26 were disposed in a plane parallel to the water line 10, this would be indicated on the next movement of the sensors since the signal detected would be equal but decreasing as the sensors are moved away from the water line 10. It would then only be necessary to rotate the sensors 24 and 26 by 90° to correct this. Although the embodiment illustrated in FIGS. 1 and 2 utilizes a water pipe, it should be understood that any type of fluid containing pipe can have the location thereof detected with the pulsing valve 20 imparting shock waves to it. For example, gas pipes can also be located, since natural gas is a fluid.

Figure 3:
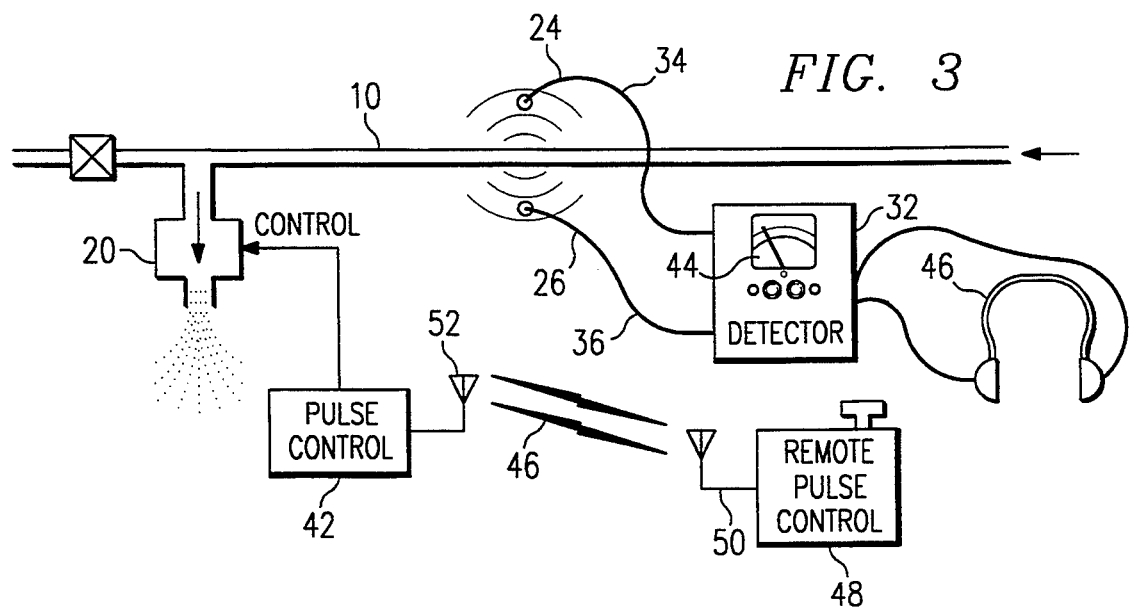
FIG. 3 illustrates a schematic representation of the method and apparatus for detecting the location of a subterranean pipe.

Referring now to FIG. 3, there is illustrated a diagram of the operation of the method and apparatus for locating the water line 10. The pulsing valve 20 is controlled by a pulse control system 42 which, as described above, can be a manually operated or electronically operated valve. In one embodiment described hereinbelow, the valve operates automatically in response to the flow to the outlet thereof.

In the embodiment of FIG. 3, the detector 32 has a meter 44 associated therewith. The meter 44 can be examined to determine the relative level of signals between sensors 24 and 26. The deflection of the needle toward the right or the left indicates the imbalance in the signals that are received at sensors 24 and 26. As explained above, it is the imbalance of these signals that indicates the location of the pipe being directly beneath the midpoint between sensors 24 and 26 or to one side or the other. In addition, a set of headphones 46 are provided, which headphones 46 can also indicate to the operator the balance between the signals received at the sensors 24 and 26.

One method for controlling the pulsing valve 20 through the pulse control system 42 is to utilize a radio frequency (RF) link 46 between a remote actuator 48 and the pulse control system 42. The remote actuator 48 has an antenna 50 and the pulse control system 42 has an antenna 52 associated therewith. The antennas 50 and 52 provide for the RF link 46 therebetween. Additionally, this can be an infrared link. It is only important to understand that some type of link need be established to allow the operator to have control of the pulsing valve 20. This could, of course, be a hardwire link to allow the operator to impart a pulse to the water line 10 and observe the meter 44 or listen to headphones 46 to determine the general location of the water line 10 beneath the ground. An added benefit of this configuration is that the distance along the pipe between the remotely controlled valve and the sensors 24 and 26 can be determined by measuring the elapsed time between the actuation of the valve and the detection of the first arrival of the energy at the sensors 24 and 26 and using the product of the elapsed time and the average propagation velocity to determine the distance along the pipe.

Figure 4:
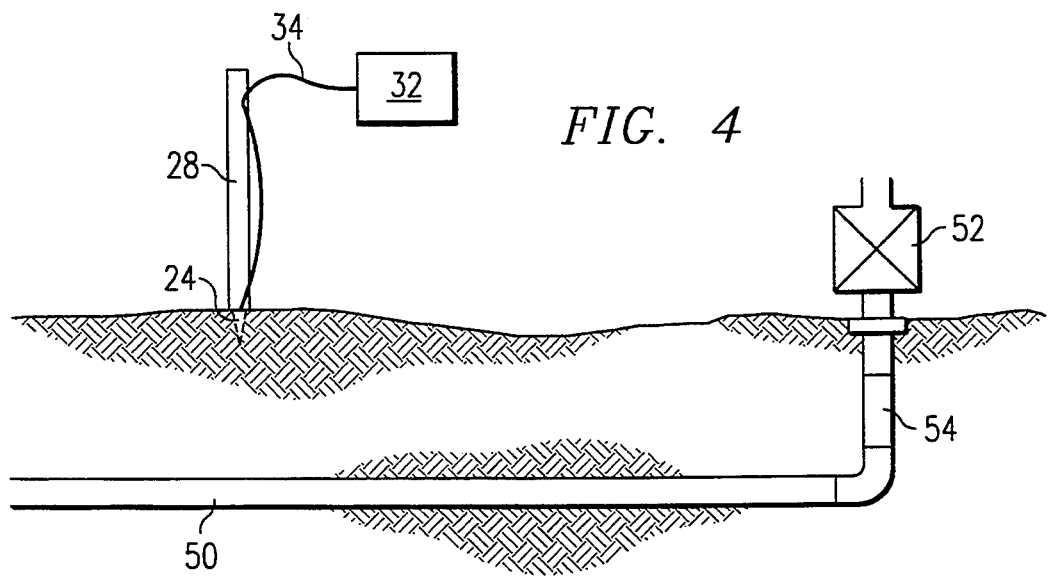
FIG. 4 illustrates an alternate embodiment for use with low pressure pipe such as that in sprinkler systems.

Referring now to FIG. 4, there is illustrated an alternate embodiment for use with low pressure lines, such as a sprinkler system. An underground pipe 50 is provided which typically extends from a water valve (not shown) which connects the pipe 50 to the main water line of the residence or with the public water supply. Although this valve (not shown) does have a solenoid actuated operation, it is typically too slow to create a water hammer effect. However, once actuated, pressure is built up in the line 50, albeit to a lower level than the line pressure, as a result of the back pressure on the sprinkler heads themselves. Since most sprinklers require a significant amount of volumetric output, the pressure in the entire water line is typically lowered twenty to thirty percent. However, there is still sufficient pressure to allow operation in accordance to the present invention. A pulsing valve 52, similar to the pulsing valve 20, is disposed in place of a sprinkler head on an upright 54 associated with the pipe 50. The pulsing valve 52 replaces one of the sprinkler heads. Water is allowed to flow through the pulsing valve 52 and then it is abruptly terminated, thus imparting a shock wave to the pipe 50. This is detected by the sensors 24 and 26, as described above.

Figure 5:
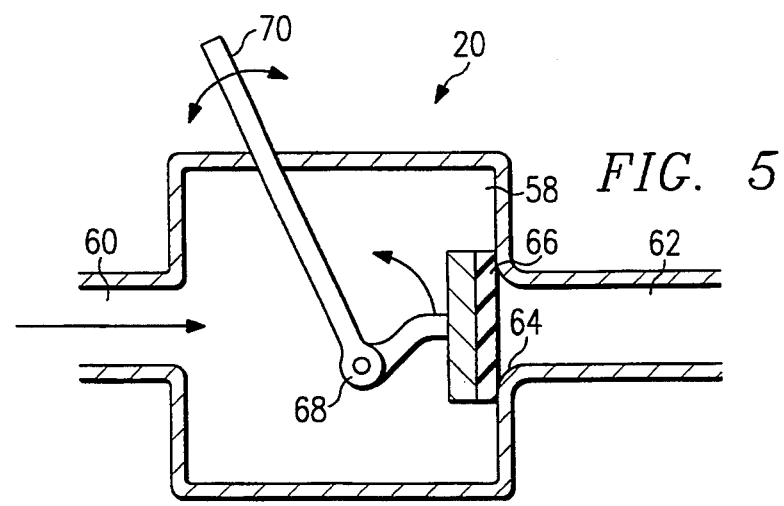
FIGS. 5 and 6 illustrate two embodiments of the pulsator valve.

Referring now to FIG. 5, there is illustrated one embodiment of pulsing valve 20 utilizing manual actuation. The valve 20 is comprised of a chamber 58, an inlet 60 and an outlet 62. A seat 64 is provided on outlet 62. A neoprene or rubber valve surface 66 is pivoted about a point 68 such that it can come into contact with the seat 64 to provide a seal therewith. An external arm 70 is provided for rotating the valve 66. It should be noted that the valve 66 is disposed for rotation within the chamber 58 such that the fluid flowing from the inlet 60 through the chamber 58 and out the outlet 62 will cause the valve 66 to abruptly seat against the seat 64 when it comes in close proximity therewith. This in effect causes a water hammer effect.

Figure 6:
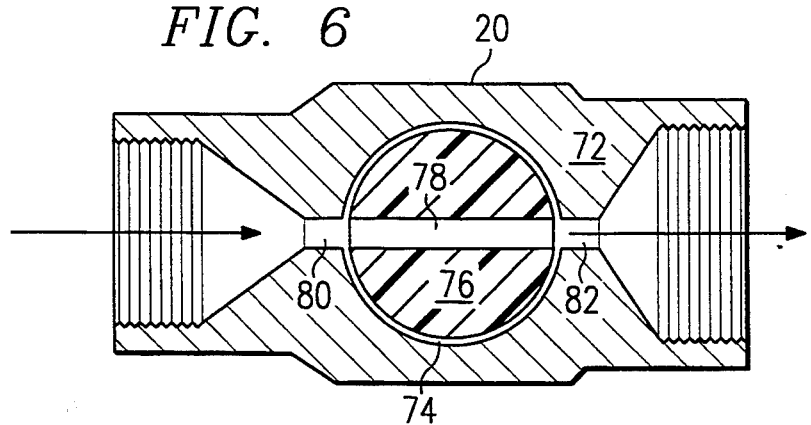

Referring now to FIG. 6, there is illustrated an alternate embodiment of the pulsing valve 20. A housings 72 is provided having a substantially circular chamber 74 associated therewith, the chamber 74 being spherical in shape. A spherical rotating element 76 is provided having a passageway 78 disposed therethrough. The housing 72 has an inlet passageway 80 and an outlet passageway 82, the inlet 80 entering one side of the chamber 74 and the outlet 82 exiting the diametrically opposite side of the chamber 74. The spherical element 76 is operable to rotate within the chamber 74 such that the passageway 78 can come into interface with the inlet 80 and the outlet 82 to provide a single passageway therethrough to allow fluid flow in an uninterrupted manner. When the valve 78 is turned a very small amount, this causes an abrupt interruption in the flow.

Figure 7:
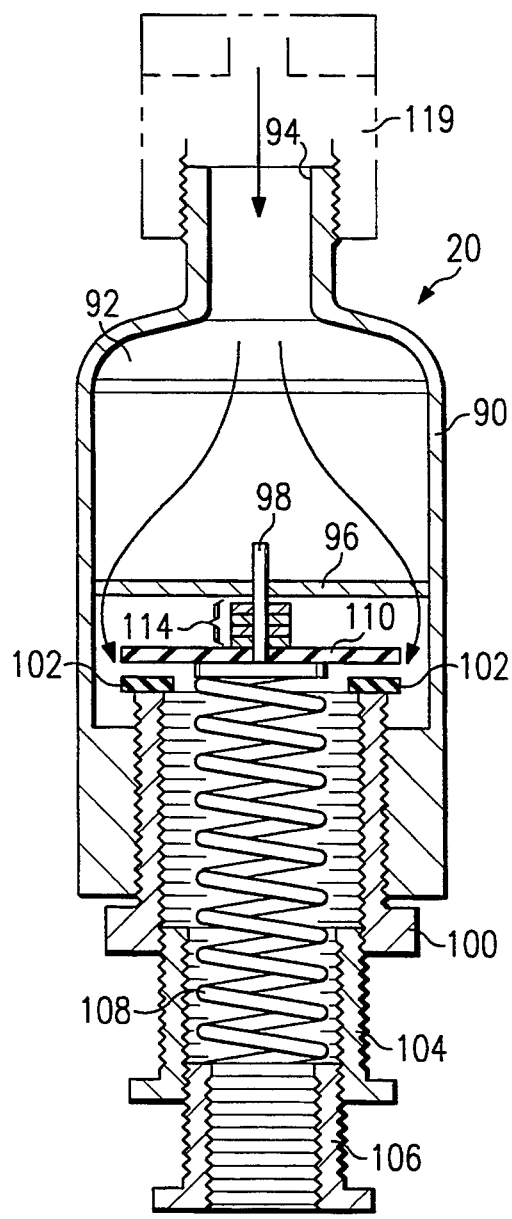
FIG. 7 illustrates the preferred embodiment of the pulsator valve.

Referring now to FIG. 7, there is illustrated the preferred embodiment of the pulsator valve 20 of the present invention. This valve illustrated in FIG. 7 operates in an automatic manner. A body 90 is provided having a bore 92 formed therein. Water enters at an inlet 94 into the bore 92. A support 96 is provided on the interior of the bore 92 to hold a stainless steel guide 98 centrally disposed in the bore 92 and along the longitudinal axis of bore 92. The stainless steel guide 98 is disposed substantially centrally in the bore 92 and extending downward away from the inlet 94.

At the diametrically opposite end of the bore 92 from the inlet 94, an outlet is provided with a threaded insert 100 that has an upper end that extends into the bore with a teflon seat 102 disposed on the upper surface thereof and with the central portion thereof being open to provide an exit. The interior of the insert 100 is threaded and has an approximately ⅜ inch threaded opening formed therein. A second insert 104 is threadedly engaged with the interior of the insert 100 such that the outer diameter thereof is approximately ⅜ inch and the interior diameter thereof is threaded and has an inner diameter of approximately ½ inch. A third insert 106 is provided with the exterior surface thereof threaded and threadedly engaged with the interior surface of the insert 104. The interior surface of the insert 106 has a threaded surface with an inner diameter of approximately ⅜ inch.

A spring 108 is provided having a diameter that is slightly larger than the inner diameter of the insert 106 and less than the inner diameter of the insert 104. The spring 106 is operable to extend from the upper or inwardly-directed surface of the insert 106 into the bore 92. A stainless steel with teflon seat valve 110 is provided to reciprocate along the longitudinal axis of the guide 98 and disposed in a plane substantially perpendicular thereto. The lower surface of the valve 110 contacts the upper end of the spring 108. A plurality of spacers 114 are provided which are disposed on the guide 98 and between the lower surface of the support 96 and the upper surface of the valve 110. The spacers 114 provide a stop to upward movement of the valve 110. Therefore, when the spring urges the valve 110 upward, the spacers 114 limit the minimum distance between the valve 110 and the lower surface of the support 96. When the valve 110 is urged downward by differential water pressure around the valve 110, the valve 110 seats against the seat 102, thereby sealing the lower end of the bore 92.

In operation, when there is no flow through bore 92, the spring 108 is tensioned such that it will push upward and open the valve 110 to allow water to flow therethrough. However, the flow of the water around the edges of the valve 110 causes a difference in pressure below the valve 110 and causes the valve 110 to move downward against the seat 102. As the valve 110 seats, the spring again urges it open, and this process continues in an oscillatory manner. The frequency of oscillation and the amplitude of the output can be adjusted by adjusting the tension in the spring 108 and also by adjusting the number of spacers 114 that are provided.

During operation of the valve, the spring 108 is tensioned to open the valve 110 to allow water to flow therethrough. As the water continues to flow, the velocity increases as it passes through the narrow valve aperture between the valve 110 and the seat 102. This distance varies at the widest position from 0.015 to 0.060 inches. The spacers 114 define the maximum opening. As the velocity increases, the pressure differential across the valve 110 builds until the force on the water flow side of the valve 110 exceeds the tension of the spring 108, thus forcing the valve 110 against the seat 102. At this point, the flow abruptly stops, thus increasing the water pressure on the pipe side of the valve, i.e., creating a water hammer.

Once the valve 110 is closed, flow ceases and then pressure continues to build due to the direction of a pressure wave directed toward the pipe and through the pipe. This pressure wave will continue on through a main, at which point it will be reflected back along the pipe. The pressure continues at a reduced intensity in both directions along the pipe between the main and the valve until this pressure wave creates a trough of reduced pressure in its way. This reduced pressure allows the spring to reopen since the pressure on the pipe side has decreased below the pressure provided by the spring 108. Flow then resumes and the system recycles immediately.

In the preferred embodiment, it is desirable to maintain a certain flow at a given pressure. For example, in one configuration, the gap between the valve 110 and the seat 102 is disposed at a dimension to allow fifty psi at a flow rate of six gpm. This is utilized for general residential water valves. When dealing with a water main, the valve is configured at such that at fifty psi, the flow rate is twelve gpm. When the valve is utilized with a water hydrant, a pressure of fifty psi is present at a flow rate of seventeen gpm.

An in-line water regulator 119 is provided on the inlet to the valve 20 in order to normalize water pressure. This pressure is normalized at approximately forty to forty-five psi. Therefore, adjustments in the valve operation due to variations in the water pressure are minimized.

Figure 8A:
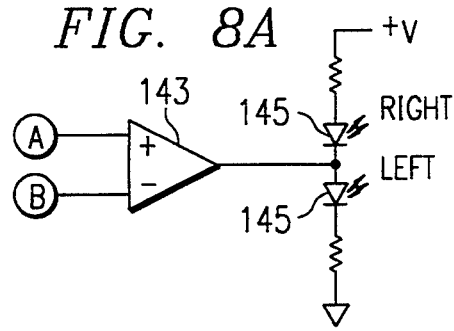
FIG. 8a illustrates an alternate embodiment of that illustrated in FIG. 8.
Figure 8:
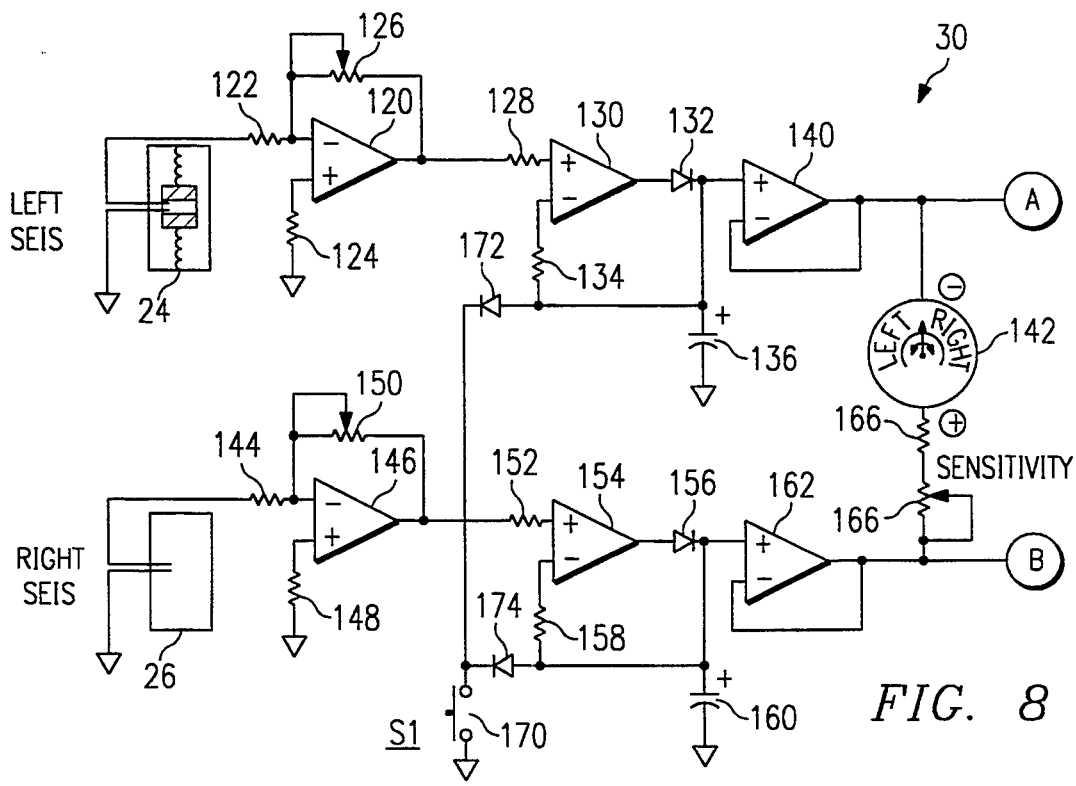
FIG. 8 illustrates a schematic diagram of the detection circuitry.

Referring now to FIG. 8, there is illustrated a schematic of the detector 32. The left seismometer 24 is input to the negative input of an OP amp 120 through resistor 122. The positive input of the OP amp 120 is connected to ground through a resistor 124. Feedback is provided through a variable resistor 126, connected between the negative input and the output of the OP amp 120. The output of the OP amp 120 is connected through a resistor 128 to the positive input of an OP amp 130, which has the output thereof connected to the anode of a diode 132. The negative input of OP amp 130 is connected through a resistor 134 to the cathode of the diode 132. The cathode of diode 132 is also connected to the positive electrode of a capacitor 136, the other electrode of which is connected to ground. The Op amp 130, the diode 132 and the capacitor 136 therefore provide a peak detector. The output of the peak detector on the cathode 132 is connected to the positive input of a unity gain amplifier 140, having the negative input thereof connected to the output thereof. The output of amplifier 140 is connected to the negative side of a left/right meter 142. An alternate implementation is illustrated in FIG. 8A which involves using a comparator circuit 143 to determine which signal is larger and turning on left or right indicator lamps or LED's 145.

The other sensor 26 is connected to a similar circuitry as described above with respect to the sensor 24. The sensor 26 is connected through a resistor 144 to a negative input of an OP amp 146 having a resistor 148 connected between ground and the positive input thereof and a positive input thereof and a feedback variable resistor 150 connected between the negative input and the output thereof. OP amp 146 has the output thereof connected through a resistor 152 to the positive input of an OP amp 154, the output thereof connected to the anode of a diode 156. The negative input thereof is connected through a resistor 158 to the cathode of the diode 156. The cathode of the diode 156 is also connected to one electrode of the capacitor 160, the other electrode of which is connected to ground. The cathode of diode 156 is connected to the positive input of the unit to grain amplifier 162, the output of which is connected through a variable resistor string 166 to the positive input of the meter 142. The resistor string 166 adjusts for sensitivity.

In order to initiate the operation of the detector 32, a single pulse switch 170 is provided which has one side thereof connected to ground and the other side thereof connected to the cathodes of two diodes, 172 and 174. The anodes of diodes 172 and 174 are connected to the cathode of diodes 132 and 156, respectively. This provides a discharge of the capacitor 136 and the capacitor 160, respectively, in one direction only.

In operation, the OP amps 120 and 146 operate to provide gain and the OP amps 130 and 154, in conjunction with the diodes 132 and 156, respectively, provide peak protection. Therefore, as the peak signals from the seismic sensors are received on the input of amplifiers 120 and 146, respectively, the signal is peak protected and stored on capacitor 136 and on capacitor 160, respectively. The relative values on the capacitors 136 and 160 would determine the deflection of the meter 142. Therefore, the meter 142 provides a differential indication of the peak detection operation.

Figure 9:
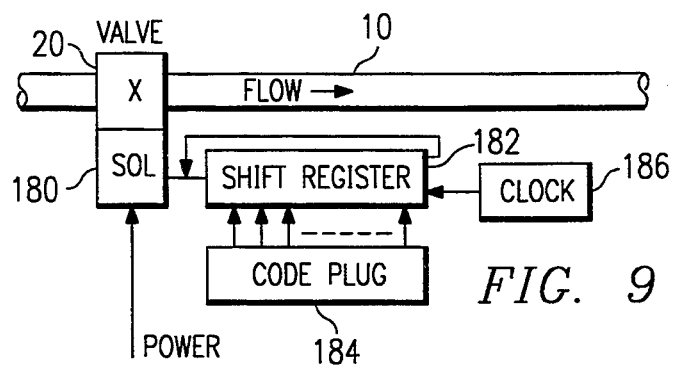
FIG. 9 illustrates a block diagram of the control circuitry for the pulsating valve utilized with a pseudo-random code.

Referring now to FIG. 9, there is illustrated a diagram of a pseudo-random transmission system for controlling the valve 20 that is disposed in series with the pipe 10. The valve 20 is controlled by solenoid 180 which has the control input thereof+connected to the output of a serial shift register 182. The serial shift register 182 is configured as a Johnson ring counter with the parallel inputs thereof connected to a code plug 184. A clock 186 is provided for sequencing the shift register 182. This is a conventional configuration.

Figure 10:
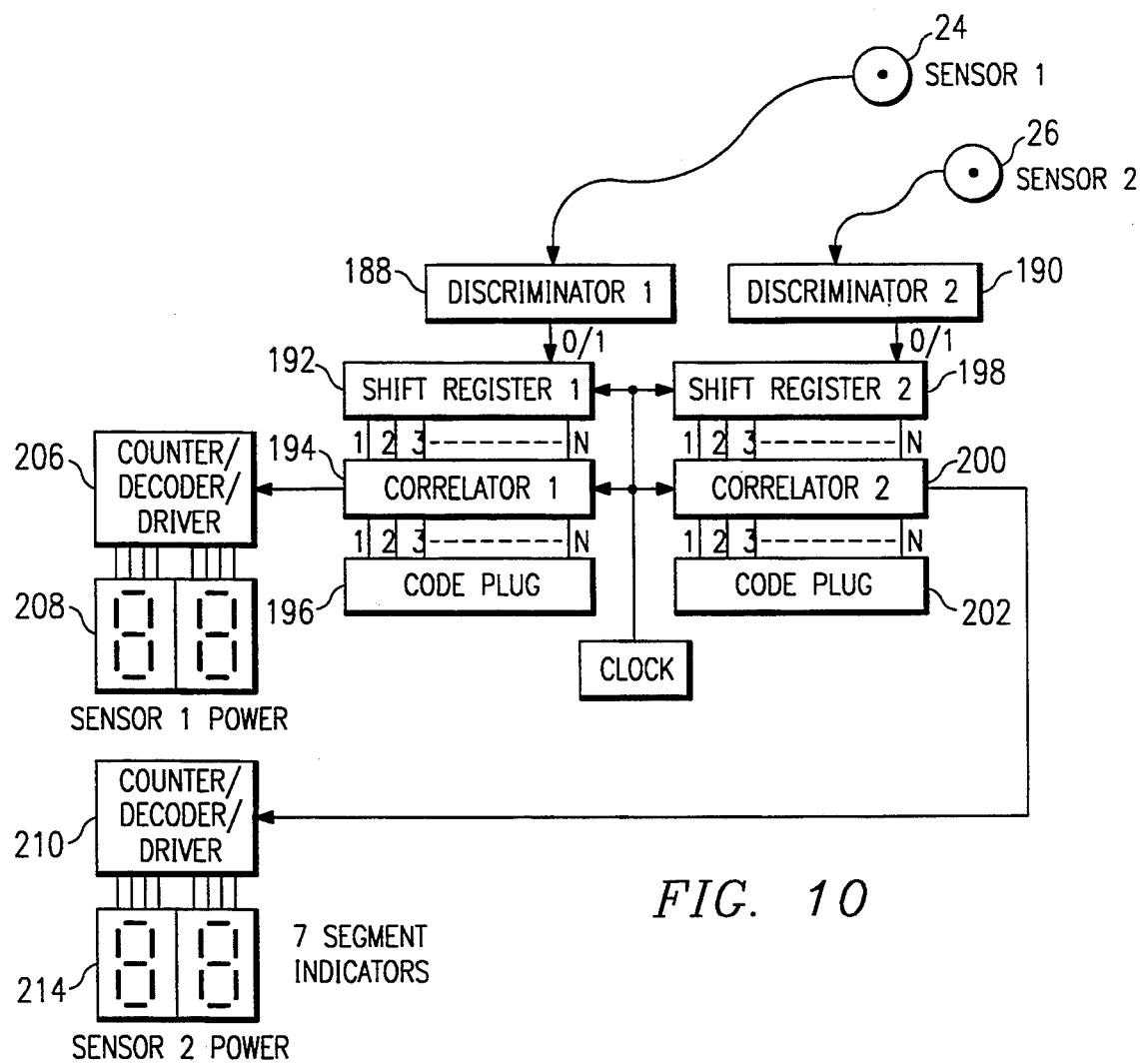
FIG. 10 illustrates the sensing circuitry for the seismic sensor in the pseudo-random code system.

Referring now to FIG. 10, there is illustrated the detection system for detecting the output of both the sensor 24 and the sensor 26 for the pseudo-random system. The output of sensor 24 is input to a discriminator 188 and the output of sensor 26 is connected to the input of a discriminator 190. Discriminator 188 is input to a shift register 192, which is a serial in shift register with parallel outputs that are connected to the parallel inputs of a correlator 194. The correlator 194 also has a set of parallel inputs which are connected to a code plug 196 which is similar to code plug 184. In a similar manner, the output of discriminator 190 is connected to the serial input of a shift register 198, the parallel outputs of which are connected to the parallel inputs of a correlator 200. The correlator 200 has a code plug 202 connected to the other set of parallel inputs thereto.

The output of correlator 194 is input to a counter/decoder/driver circuit 206, the output of which drives a display 208. In a similar manner, the output of correlator 200 is input to a counter/decoder/driver circuit 210 the output of which is connected to a display 214. The counter/decoder/driver circuits 206 and 210 are operable to the detect when a pseudo-random code has been completed for a given cycle and increment the internal counter thereto. Each increment indicates that the power was present for a sufficient amount of time. Therefore, when one of the sensors 24 and 26 is moved away from the pipe 10, more errors occur. For each error there is no correlation. As such, the counter would not be incremented when an error occurs. Therefore, only when there is sufficient power will no errors occur and the counter incremented. The closer that one sensor is to the pipe, the more the counter is incremented. By observing this, one can determine the relative location of the sensors 24 and 26 to the pipe 10.

Figure 11:
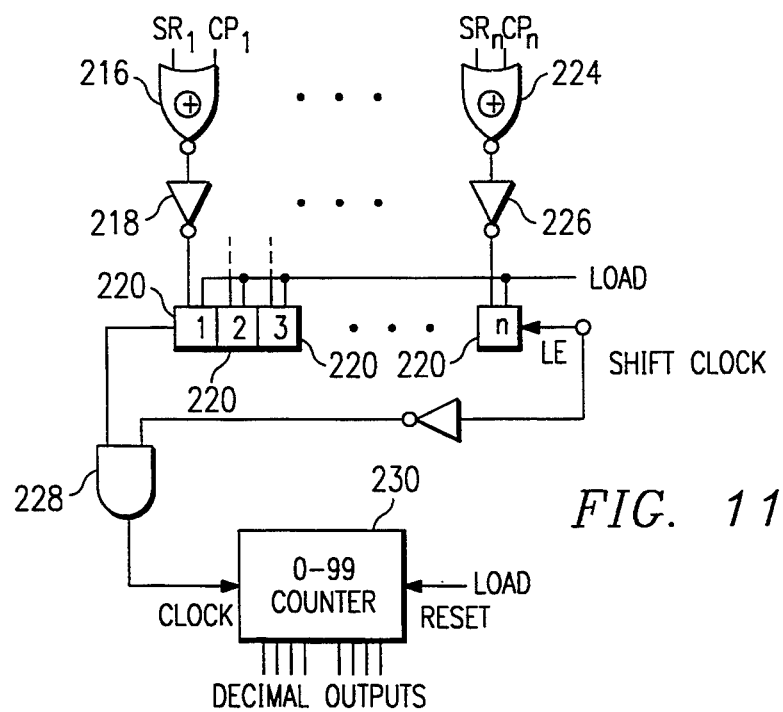
FIG. 11 illustrates the block diagram of the correlator operation for the pseudo-random system.

Referring now to FIG. 11, there is illustrated a detailed logic diagram of the correlators 194 and 200. An input SR1, representing the ith position of the associated one of the shift registers 192 or 198, is input to one input an Exclusive OR gate 216. The other input thereof is connected to a signal CPi, which represents the ith position of the code plug 196 or 202. The output of the Exclusive OR gate 216 is input through an invertor 218 to the input of a first stage 220 of a shift register, this shift register having n stages 220. The nth stage 220 of the shift register as loaded on the parallel input thereof with signals SRn and CPn which are combined through an Exclusive OR gate 224 through an invertor 226. Therefore, each of the stages 220 of the shift register receives one output of shift register 192 or 198, and one output of the associated one of the code plugs 196 or 202. The output of the first stage of the shift register 220 and the inverted shift clock are input to inputs of AND gate 228, the output of which of which provides the clock input for a counter 230. The counter 230 receives a Load signal on a Reset input. The counter 230 counts from zero to ninety-nine. This provides the outputs to the displays 208 and 214.

Figure 12:
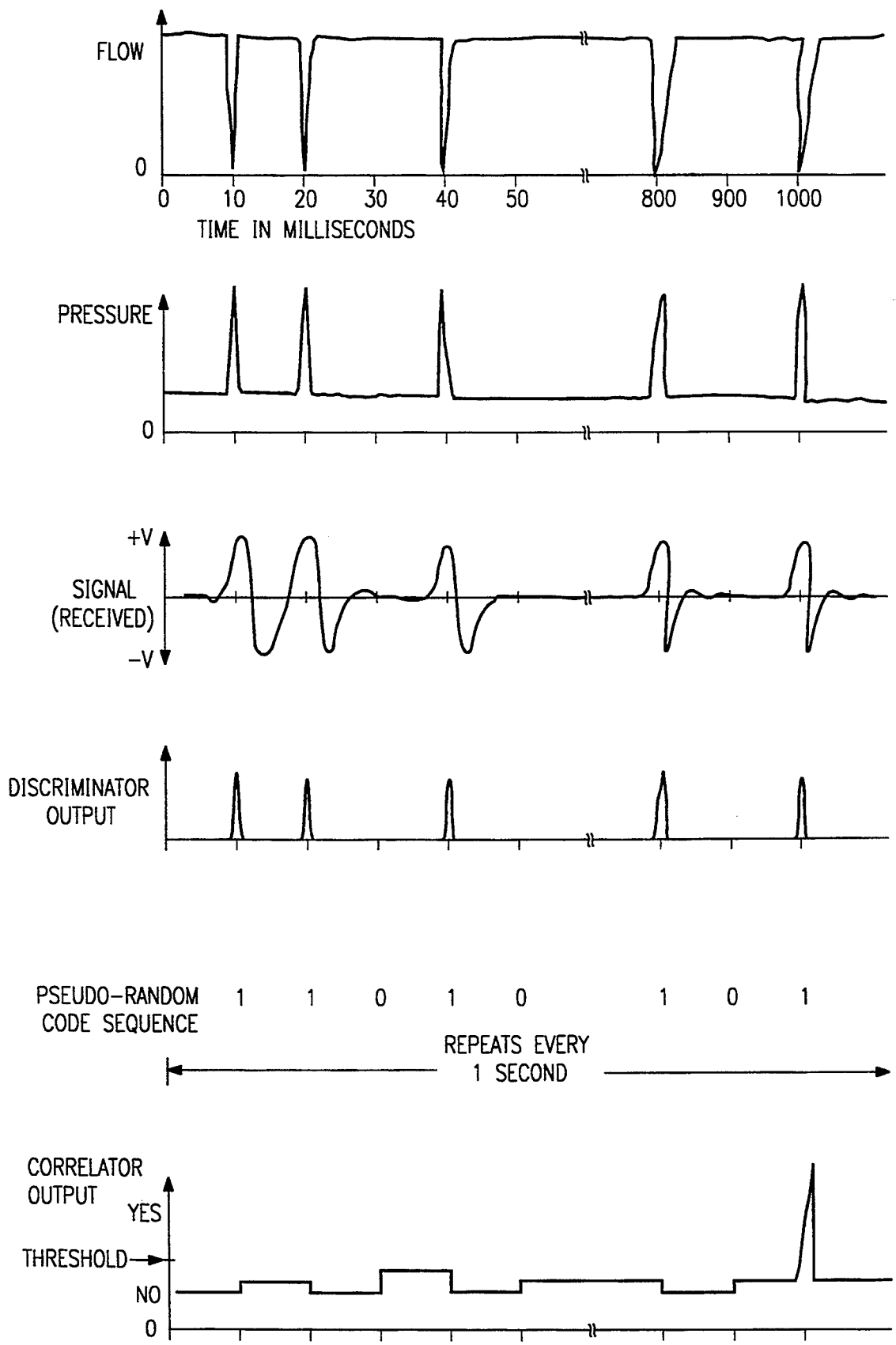
FIG. 12 illustrates timing diagrams for the pseudo-random system.

Referring now to FIG. 12, there is illustrated timing diagrams for the operation of the pseudo-random system of the present invention. In the first timing diagram labelled "Flow", the interruptions in the flow are illustrated by negative peaks. In the second diagram labelled "Pressure", it can be seen that the pressure results in positive peaks that are aligned with the negative peaks in the Flow diagram. In the third diagram labelled "Signal", there are represented the actual signals that are received by each of the sensors. It can be seen that a peak occurs that is lined up with the negative peaks in the Flow diagram. These are their discriminated, as illustrated in the fourth diagram labelled "Discriminator Output". Each positive peak represents a logic "1" and the lack of a peak represents a logic "0". The correlator senses the discriminator output, as represented by a diagram labeled "Correlator Outputs". When the correlator output rises above a threshold, this represents a positive recognition of the discriminated signal. This should repeat every one second in the preferred embodiment.

Figure 13:
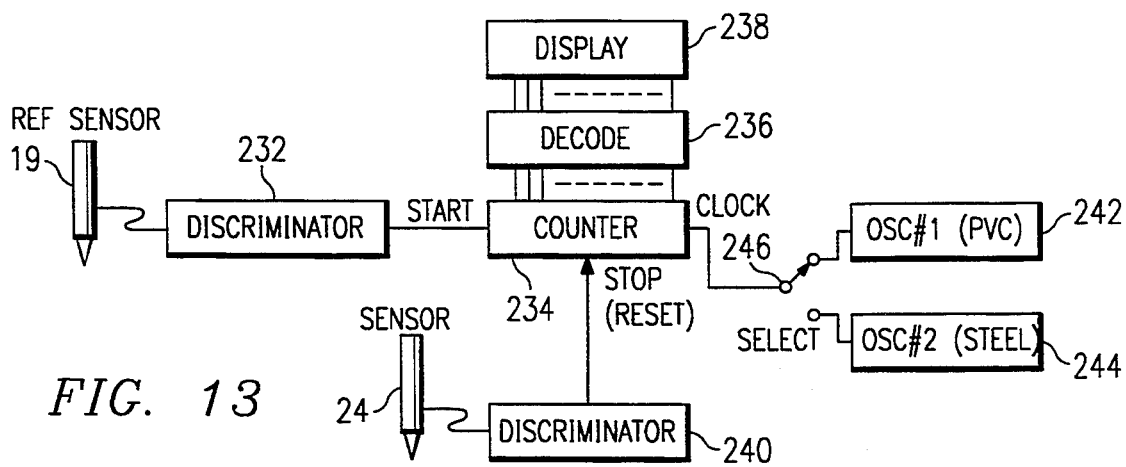
FIG. 13 illustrates a block diagram for distance measurement.

Referring now to FIG. 13, there is illustrated a block diagram of the method for measuring distance with any system. The reference sensor 19 has the output thereof connected to a discriminator 232, the output of which is input to a counter 234 as a serial input. A decoder 236 is connected to the parallel outputs of counter 234, the output of decoder 236 driving a display 238. A second discriminator 240 is provided which is connected to the output of sensor 24. The discriminator 240 is connected to the reset input of the counter 234. The clock input of counter 234 is connected to one of two oscillators. A first oscillator 242 is provided with a period that matches the ideal conditions for plastic pipe. A second oscillator 244 is provided which represents the ideal conditions for metal pipe. A switch 246 is provided for selecting between the two. Therefore, for each pulse that is discriminated, the counter 234 is incremented until it is reset by the discriminator 240. In this manner, the counter 234 will provide an average count between the various pulses. The two oscillators 242 and 244 account for the conduction times of the pulse down the pipe.

In summary, there has been provided a method and apparatus for location of an underground pipe. In one aspect of the invention, two sensors are provided that can be disposed in the ground proximate to or above a subterranean fluid carrying pipe to detect vibrations in the ground. A pulsing valve is disposed somewhere in communication with the pipe to allow fluid to flow outward therefrom. The flow is periodically interrupted in an abrupt manner causing a water hammer effect to impart a shock wave to the pipe, this shock wave flowing down the pipe. The shock wave is conducted to the surrounding ground to allow detection thereof by the sensors. Also, by determining the relative strength between the two sensors, the location can be detected. By sensing the initial motion at a reference point near the valve, the distance along the pipe can be measured.

Although the preferred embodiment has been described in detail, it should be understood that various changes, substitutions and alterations can be made therein without departing from the spirit and scope of the invention as defined by the appended claims.

What is claimed is:

1. An apparatus for detecting the location of a subterranean fluid carrying pipe with fluid disposed therein, comprising:

a sensor for being disposed in the ground, said sensor operable to provide an output in response to receipt of energy in the ground in the locale of said sensor;

a fluid carrying subterranean pipe disposed in the ground for carrying fluid therethrough;

means for pulsing energy within the fluid in the pipe in a first operation, and in a second operation, abruptly interrupting the flow of fluid in the pipe to impart energy thereto, the energy being conducted to the surrounding medium and detected by said sensor;

means for detecting the energy received at said sensor that was imparted to the surrounding earth from the pipe; and means for measuring the detected energy detected at said sensor to provide an indication thereof;

wherein displacement about the pipe of said sensor can be facilitated until it is determined that the detected energy determined at said sensor is substantially peaked, indicating that said sensor is directly over and straddles the pipe.

2. A method for detecting the location of a subterranean fluid carrying pipe with fluid disposed therein, comprising:

allowing fluid to flow through the subterranean pipe;

abruptly interrupting the flow of fluid in the pipe to impart a shock wave thereto, the shock wave being conducted to the surrounding medium as energy;

disposing at least a first sensor proximate to the ground in the general location of the pipe, the at least first sensor operable to sense the energy imparted to the surrounding medium from the pipe, the energy resulting from the shock wave conducted through the surrounding medium from the pipe;

detecting the energy received at the first sensor that was imparted to the surrounding medium from the pipe;

measuring the detected energy detected at the first sensor; and moving the at least first sensor until the at least first sensor detects a level of energy that has peaked to a substantially maximum value.

3. The method of claim 2 wherein the step of abruptly interrupting the flow of fluid in the pipe occurs on a periodic basis.

4. The method of claim 2 wherein the step of abruptly interrupting the flow of fluid in the pipe is controlled by an operator disposed proximate to the at least first sensor to allow remote control thereof.

5. The method of claim 2 wherein the step of allowing the fluid to flow through the subterranean pipe and subsequently abruptly interrupting the flow of fluid in the pipe operates on a periodic basis in an automatic manner such that a predetermined sequence of shock waves are imparted to the pipe.

6. The method of claim 2 wherein the step of abruptly interrupting the flow of fluid in the pipe is manually controlled.

7. The method of claim 2 wherein the step of allowing the fluid to flow through the subterranean pipe and the step of abruptly interrupting the flow of fluid comprises:

disposing a valve on one end and interfaced with the pipe; and disposing the valve in a normally open position and then closing the valve at select times, the step of closing the valve resulting in abrupt interruption of the fluid flow through the valve.

8. The method claim 2 and further comprising disposing a reference sensor proximate to the point at which the flow of fluid is interrupted and comparing the time at which the shock wave is received at the reference sensor and the at least first sensor, and calculating distance from this comparison in accordance with a predetermined algorithm.

9. The method of claim 2 wherein the step of abruptly interrupting the flow of fluid comprises abruptly interrupting the flow of fluid in a series of periodic pulses, the periodic pulses occurring in a pseudo-random sequence, and wherein the step of detecting the seismic energy received at the at least first sensor includes the steps of discriminating the pulses from the surrounding medium of the pipe and correlating the received pulses with the pseudo-random sequence.

10. The method of claim 2 wherein the step of abruptly interrupting flow includes disposing valves at a plurality of points along pipelines and remotely controlling the valves to abruptly interrupt the flow at predetermined times.

* * * * *